US007046285B2

(12) United States Patent
Miyagi et al.

(10) Patent No.: US 7,046,285 B2
(45) Date of Patent: May 16, 2006

(54) DIGITAL PHOTOGRAPHING APPARATUS HAVING POSITION INFORMATION CAPABILITY

(75) Inventors: Shiro Miyagi, Tokyo (JP); Yuko Mimura, Tokyo (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 09/748,513

(22) Filed: Dec. 26, 2000

(65) Prior Publication Data

US 2001/0040629 A1 Nov. 15, 2001

(30) Foreign Application Priority Data

Dec. 28, 1999 (JP) ................................ 11-374229

(51) Int. Cl.
*H04N 5/225* (2006.01)

(52) U.S. Cl. .............................. 348/333.05; 348/231.5

(58) Field of Classification Search ........... 348/207.99, 348/207.1, 222.1, 231.99, 231.2–231.9, 552, 348/333.01, 333.02, 333.05, 333.11; 715/835, 715/838
See application file for complete search history.

(56) References Cited

U.S. PATENT DOCUMENTS 5,169,342 A * 12/1992 Steele et al. ................ 345/157
5,267,042 A 11/1993 Tsuchiya et al.
5,296,884 A 3/1994 Honda et al.
5,848,373 A * 12/1998 DeLorme et al. ........... 701/200
6,023,241 A * 2/2000 Clapper ................. 342/357.13
6,133,947 A * 10/2000 Mikuni ....................... 348/143
6,195,122 B1 * 2/2001 Vincent ...................... 348/169
6,199,014 B1 * 3/2001 Walker et al. .............. 701/211
6,222,985 B1 * 4/2001 Miyake ...................... 386/117
6,282,362 B1 * 8/2001 Murphy et al. ............... 386/46
6,437,797 B1 * 8/2002 Ota ............................ 345/638
6,504,571 B1 * 1/2003 Narayanaswami et al. ....... 348/231.99
6,665,004 B1 * 12/2003 Paff ........................... 348/156
2003/0201914 A1 * 10/2003 Fujiwara et al. ....... 340/995.24

FOREIGN PATENT DOCUMENTS

EP 0 462 905 12/1991
EP 0 650 125 4/1995
EP 0 715 453 6/1996
JP 09179491 * 7/1997

OTHER PUBLICATIONS

Microsoft Corporation. "User's Guide for Microsoft Windows for Workgroups & MS-DOS", 1994, p. 57.*
Patent Abstracts of Japan vol. 016, No. 272 (P-1373), Jun. 18, 1992 & JP 04 070724 A (Minolta Camera CO LTD), Mar. 5, 1992.

* cited by examiner

*Primary Examiner*—Tuan Ho
*Assistant Examiner*—Jason Whipkey
(74) *Attorney, Agent, or Firm*—Frommer Lawrence & Haug LLP; William S. Frommer

(57) ABSTRACT

A digital photographing apparatus, portably structured, for recording a photographed digital picture signal to a recording medium and reproducing a digital picture signal from the recording medium The apparatus includes a recording means for recording the digital picture signal supplied from a signal processing means and position information supplied from a position information obtaining means to the recording medium, a reproducing means for reproducing the digital picture signal and the position information from the recording medium, a map information obtaining means for obtaining map information, a table creating means for creating a table for the reproduced position information, and a controlling means for referencing the table for the position information and displaying an icon corresponding to the position information and the map information to the displaying means.

11 Claims, 12 Drawing Sheets

Fig. 3

```
<?xml version="1.0" encoding="Shift_JIS"?>                                      11
<!DOCTYPE sonypoix PUBLIC "-//MOSTEC//POIX V2.0//EN" "poix.dtd">
<sonypoix version="1.0">
<format>
    <datum>tokyo</datum>                                                        12
    <unit>degree</unit>
    <time>1999-10-20T10:35:47+09:00</time>
</format>
<sonypoi>                                                                       13
    <index pos="+35.62222 +139.74528  14000000  fix tokyo"/>
    <poi>
        <point>
            <pos>
                <lat>35.62222</lat>
                <lon>139.74528</lon>
            </pos>                                                              14
        </point>
        <image href="../../dcim/100msdcf/dsc00001.jpg">
            <comment>SONY Digital Still Camera Cybershot DSC-F55</comment
>
        </image>
    </poi>
    <category>14000000</category>  ~15
    <gpstime>1999-10-20T10:35:47+09:00</gpstime>  ~16
</sonypoi>
```

*Fig. 4*

| HEXADECIMAL CODE | LARGE CATEGORY |
|---|---|
| 00000000 | NOT CATEGORIZED |
| 01000000 | LEISURE SPOTS |
| 02000000 | RESTAURANTS |
| 03000000 | ACCOMMODATION |
| 04000000 | SIGHTSEEING SPOTS AND HISTORICAL SPOTS |
| 05000000 | STORES |
| 06000000 | SPORTS FACILITIES |
| 07000000 | FINANCIAL ORGANIZATION |
| 08000000 | CARS |
| 09000000 | ROAD INFORMATION |
| 0A000000 | STATIONS |
| 0B000000 | AIRPORTS |
| 0C000000 | FERRIES AND PORTS |
| 0D000000 | PUBLIC ORGANIZATION |
| 0E000000 | HOSPITALS |
| 0F000000 | SCHOOLS AND EDUCATIONAL ORGANIZATION |
| 10000000 | PLANNING |
| 11000000 | RELIGIOUS FACILITIES |
| 12000000 | HOME |
| 13000000 | PERSONAL |
| 14000000 | PHOTOGRAPHED (RECORDED) POSITIONS |
| 15000000 | RESERVED FOR BROADCAST WORK |

Fig. 7

| 21 | 22 | 23 | 24 |
|---|---|---|---|
| 37. 65. 152 | 135. 72. 225 | 14000000 | Dsc00005. jpg |
| 37. 66. 250 | 135. 65. 105 | 14000000 | Dsc00006. jpg |
| 37. 66. 251 | 135. 65. 104 | 14000000 | Dsc00007. jpg |
| 37. 66. 255 | 135. 64. 780 | 04000000 | Ssp00001. jpg |
| 37. 66. 251 | 135. 63. 330 | 05000000 | Shp00001. jpg |

DIGITAL PHOTOGRAPHING APPARATUS HAVING POSITION INFORMATION CAPABILITY

BACKGROUND OF THE INVENTION

1. Field of the Invention

The present invention relates to a digital photographing apparatus for photographing a picture such as a still picture or a moving picture, recording the photographed picture to a record medium, reproducing a picture from the record medium, and displaying the reproduced picture.

2. Description of the Related Art

As an example of a digital photographing apparatus, a digital still camera that obtains position information (latitude and longitude) of the position at which a picture was photographed (hereinafter the position is referred to as photographed position), and records the position information along with picture data to the record medium. When picture data is reproduced from a record medium and displayed, the position information is displayed as numeric values on a reproduced picture screen. However, with the numeric values of latitude and longitude, it is difficult for the user to know where the picture was photographed.

To reproduce picture data recorded by a digital still camera, a picture reproducing apparatus composed of a map database, a displaying device, and a system controller is used along with the digital still camera. The digital still camera records picture information and position information of the photographed position thereof. When the picture information photographed by the digital still camera is displayed, the photographed position is displayed on a map so that picture information can be searched corresponding to the photographed position. Such a technology is disclosed in Japanese Patent Laid-open Publication No. 9-252454.

According to the related art reference, a picture reproducing apparatus is required in addition to a digital still camera. Thus, the digital still camera has only functions for recording picture information and position information. Moreover, the digital still camera has restrictions about the performance of the CPU and the storage capacity of the memory. Thus, it cannot quickly perform a process for reading position information from a record medium and displaying icons thereof on a map picture.

OBJECTS AND SUMMARY OF THE INVENTION

Therefore, an object of the present invention is to provide a portable digital photographing apparatus that allows a picture to be recorded, reproduced and quickly and easily iconized on a map.

The present invention is a digital photographing apparatus, portably structured, for recording a photographed digital picture signal to a record medium and reproducing a digital picture signal from the record medium, comprising a photographing means for photographing a picture and outputting a picture signal, a signal processing means for processing the picture signal supplied from the photographing means, a position information obtaining means for obtaining position information, a displaying means for displaying the digital picture signal supplied from the signal processing means, a recording means for recording the digital picture signal supplied from the signal processing means and the position information supplied from the position information obtaining means to the record medium, a reproducing means for reproducing the digital picture signal and the position information from the record medium, a map information obtaining means for obtaining map information, a table creating means for creating a table for the reproduced position information, and a controlling means for referencing the table for the position information and displaying an icon corresponding to the position information and the map information to the displaying means.

According to the present invention, in a digital photographing apparatus that allows a photographed picture to be displayed and recorded on a record medium and a picture reproduced from the record medium to be displayed, an icon corresponding to obtained position information can be displayed on a map. Thus, with the digital photographing apparatus, when the user selects an icon as position information of the photographed position of a desired picture, the picture can be displayed. In addition, since a table for reproduced position information is created, such a process can be quickly and easily performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing an example of data of position information based on the POIX according to the embodiment of the present invention;

FIG. 4 is a schematic diagram showing definitions of category code according to the embodiment of the present invention;

FIG. 7 is a schematic diagram showing an example of a created table;

DETAILED DESCRIPTION OF THE PREFERRED EMBODIMENT

Figure 1:
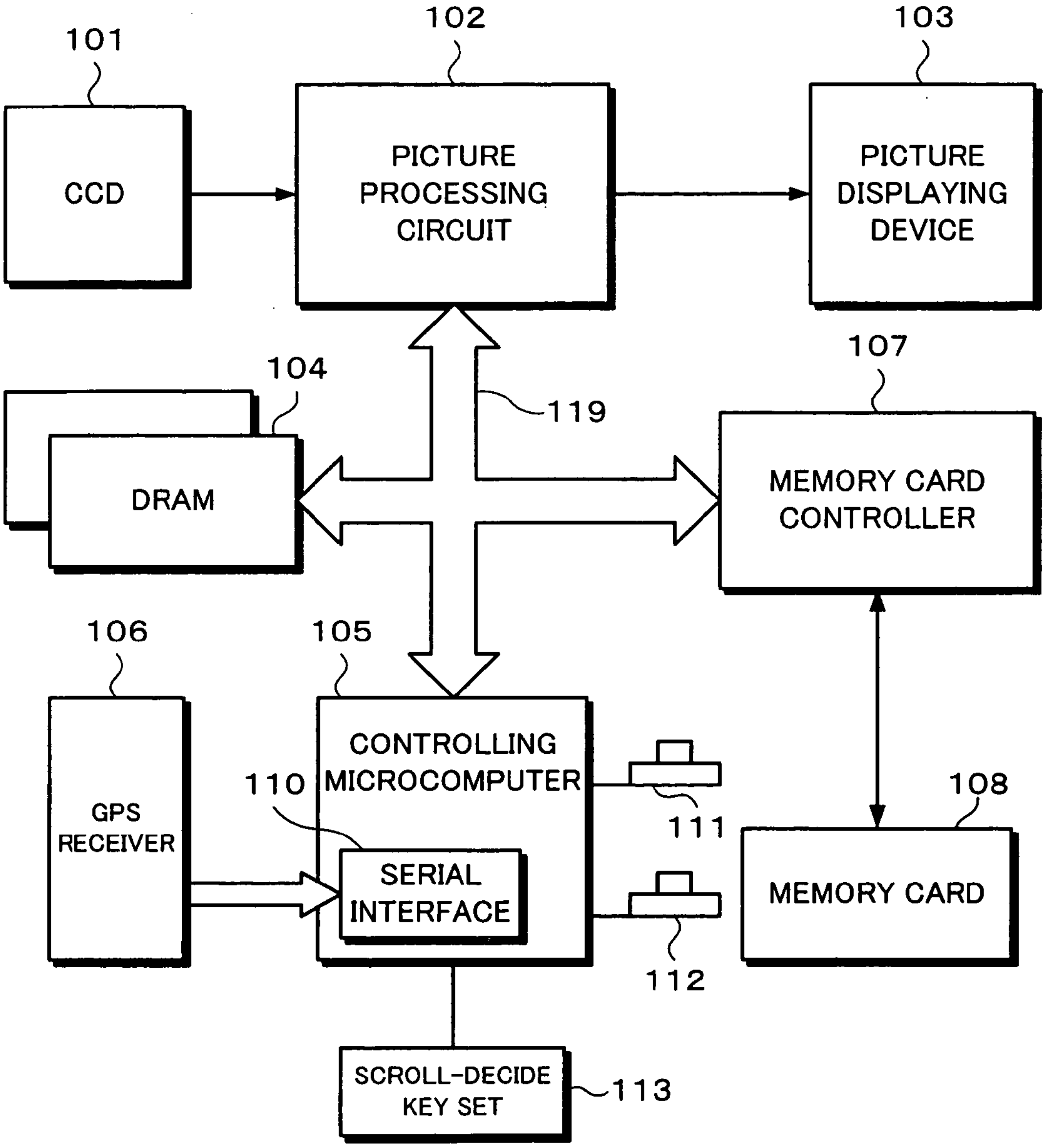
FIG. 1 is a block diagram showing the structure of an embodiment of the present invention.

Next, an embodiment of the present invention will be described. The embodiment of the present invention is a digital still camera. FIG. 1 shows the system structure of the embodiment. In FIG. 1, reference numeral 101 is a CCD (Charge Coupled Device). The CCD 101 outputs an object image as a photograph signal through a lens portion. The photograph signal is supplied to a picture processing circuit 102.

The picture processing circuit 102 comprises a camera signal processing portion, a memory controller, a picture compressing/decompressing portion, a display picture buffer, and a D/A converter. The camera signal processing portion includes a clamping circuit, a luminance signal processing circuit, a contour compensating circuit, a defect compensating circuit, an automatic aperture controlling circuit, an automatic focus controlling circuit, and an automatic white balance compensating circuit. A display picture buffer memory and a data transmission path 109 are connected to the memory controller. An output signal of the display picture buffer memory is supplied to a picture displaying device 103 through a D/A converter.

The picture compressing/decompressing portion compresses picture data corresponding to for example the JPEG (Joint Photographic Experts Group) format. In addition, the picture compressing/decompressing portion decompresses compressed picture data. The picture displaying device 103 is structured as a displaying device such as an LCD (Liquid Crystal Display) built in the camera. A picture signal is supplied from the picture processing circuit 102 to the picture displaying device 103. Thus, a picture that is being photographed is displayed on the picture displaying device 103. In addition, a picture that is read from a removable record medium such as a memory card 108 is displayed.

A DRAM (Dynamic Random Access Memory) 104, a controlling microcomputer 105, and a memory card controller 107 are connected to the data transmission path 109. The memory card controller 107 writes and reads data to/from the memory card 108. The memory card 108 contains a flash memory, a buffer memory, and a memory controller. The memory card 108 is attachable and detachable to/from the digital still camera main body. The record medium is not limited to the memory card. In other words, a floppy disk, a rewritable optical disc, or the like can be used.

A scale up switch 111, a scale down switch 112, and a scroll—decide key set 113 are connected to the controlling microcomputer 105. Besides those switches, other operator's switches such as a shutter button and an operation mode setup switch (not shown) are disposed. The scale up switch 111 is used to enlarge the size of a picture displayed on the picture displaying device 103. For example, whenever the scale up switch 111 is pressed, the size of the picture is enlarged by 10%. In contrast, the scale down switch 112 is used to reduce the size of a picture displayed on the picture displaying device 103. Likewise, whenever the scale down switch 112 is pressed, the size of the picture is reduced by 10%. According to the embodiment of the embodiment, the scale down switch 112 is used to reduce the size of an enlarged picture. The minimum size of a picture is the regular picture size.

Position information (the latitude and longitude of the current positon) is supplied from a GPS unit 106 to the controlling microcomputer 105 through a serial interface 110. The GPS unit 106 receives radio waves from a plurality of GPS satellites and calculates the latitude and longitude of the current positon. The GPS unit 106 generates valid longitude information and latitude information at intervals of for example one second.

When the user presses the shutter button, a picture signal photographed by the CCD 101 is supplied to the picture processing circuit 102. The picture processing circuit 102 processes the picture signal. The resultant picture signal is stored to the DRAM 104 under the control of a memory controller of the picture processing circuit 102. In addition, when the shutter button is pressed, the GPS unit 106 measures the latitude and longitude of the current position (namely, the photographed position). The measured latitude and longitude information is supplied from the GPS unit 106 to the DRAM 104 through the serial interface 110 of the controlling microcomputer 105 and the data transmission path 109. The DRAM 104 stores the latitude and longitude information.

When the photographed original picture data is stored to the DRAM 104, the original picture data is compressed by the picture compressing/decompressing portion of the picture processing circuit 102 under the control of the controlling microcomputer 105. The compressed picture data (JPEG data) is stored to the DRAM 104. AT that point, the compressed picture data is stored to a particular area different from the area for the original picture data. The compressed picture data that is read from the DRAM 104 under the control of the controlling microcomputer 105 is written to the memory card 108 through the memory card controller 107.

When a picture such as a still picture stored in the memory card 108 is reproduced, the compressed picture data is read from the memory card 108 through the memory card controller 107. The compressed picture data is decompressed by the picture compressing/decompressing portion of the picture processing circuit 102. The decompressed picture data is written to the DRAM 104. The picture data stored in the DRAM 104 is displayed on the picture displaying device 103 through the picture processing circuit 102.

Figure 2:
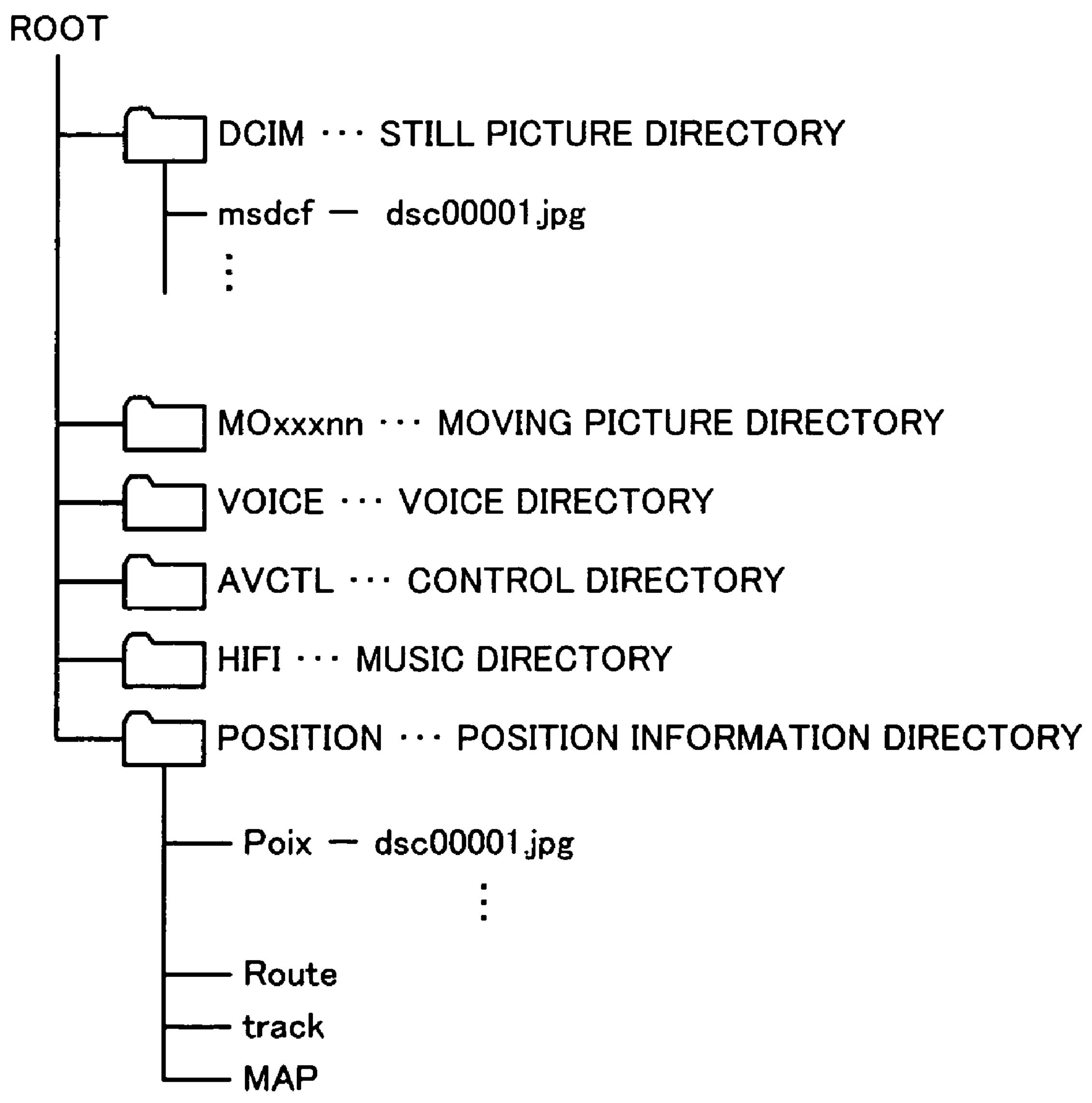
FIG. 2 is a schematic diagram showing the file structure of a memory card according to the embodiment of the present invention.

The memory card 108 has a file structure as shown in FIG. 2. Referring to FIG. 2, the memory card 108 has directories of a still picture directory (DCIM), a moving picture directory (MOxxxnn), a voice directory (VOICE), a control directory (AVCTL), a music directory (HIFI), and a position information directory (POSITION). Each directory has sub directories. For example, the still picture directory (DCIM) has sub directories such as msdcf. When a still picture is photographed by the digital still camera and the still picture is compressed corresponding to the JPEG format, the still picture is assigned dsc00001.jpg as a file name and an extension and stored to the sub directory msdcf.

The position information directory has sub directories Poix (position information data), Route (route data), track (track data), MAP (map data), and so forth. When a still picture is photographed by the digital still picture, position information of the photographed position thereof is stored to a file dsc0001.poi or the like that is placed below the sub directory Poix. In this case, the extension poi represents that the file is based on the POIX. One position information file contains information of one position. Likewise, one MAP file contained in the sub directory MAP is composed of data of at least one map. Map data is downloaded from a car navigation system, a map database, or the like to the memory card 108.

The controlling microcomputer 105 pre-detects the file structure of the memory card 108. When photographed still picture data is written to the memory card 108, the controlling microcomputer 105 assigns a file name to the still picture data. In addition, when desired still picture data is read from the memory card 108, the controlling microcomputer 105 designates the file name of the still picture data to be read.

As was described above, when the shutter button is pressed, the position information (latitude and longitude) of the photographed position is written to the DRAM 104. The position information is written to the memory card 108 through the memory card controller 107 under the control of the controlling microcomputer 105. When position information is recorded to the memory card 108, there are two methods. As a first method, the position information is recorded as a file different from a picture file. As a second method, the positon information is directly recorded to a picture file.

As an example of the first method, a position information file in a data format based on the POIX (Point Of Interest eXchange language) is used. The POIX is a data format that was established by MOSTEC (Mobile Information Standard TEchnical Committee) so as to exchange position information on the Internet. The POIX is a markup language based on the XML (eXtensible Markup Language) of which data is hierarchically structured using tags. The position information represents information of an objective position and information thereabout.

In other words, the position information is converted into a position information file in the data format based on the POIX under the control of the controlling microcomputer 105. The position information file is recorded as a file to the sub directory Poix of the memory card 108. A picture file name to be linked can be described in a position information file. Thus, a file of a photographed picture and position information of a photographed position can be linked.

FIG. 3 shows an example of a data position information file based on the POIX. The data position information file is created by the controlling microcomputer 105. Referring to FIG. 3, a portion of first three lines (denoted by portion 11) describes a version number of the POIX for use. The portion 11 also describes a version number of a particular extension (sonypoix) proposed by the applicant of the present invention. A portion of the next five lines (portion 12) describes elements of the format. The elements of the format represent that the geodesic system (datum) used in the POIX is (tokyo: Japan geodesic system), that the coordinate system (unit) is (degree), and that the date and time of information creation is Oct. 20, 1999, 10:35:47+09:00 (time zone). In addition to those elements, the format defines an altitude, a traveling state of a mobile substance, a traveling direction, a sequence of locus coordinate points, an object name, a description of the object, an accessing method to the object, a start point, an arrival point, a route from the start point to the arrival point, and the name of the distributer.

A portion of the 10-th and 11-th lines (portion 13) describes a search index (index pos) for each element of POI (Point Of Interest) that follows. In other words, the portion 13 describes an index having redundant position information of information (latitude and longitude) of an objective position.

A tag of the search index contains position information (latitude and longitude), the category of information, the distinguishment of a mobile substance or a non-mobile substance, and a geodesic system. In the example shown in FIG. 3, the position is at latitude 35.62222° N and longitude 139.74528° E; the category code is 14000000; the mobile/non-mobile distinguishment is non-mobile (fix); and the geodesic system is (tokyo). The number of digits of each of latitude and longitude is fixed. In the POIX format, the degree notation or the degree-second-minute notation can be selected. However, in the index, the degree notation is fixedly used. Since the number of digits and the notation are fixed, the index can be quickly read and converted into the internal format of the apparatus.

A portion of the next 11 lines (portion 14) describes POI information. In the portion 14, the representative position (point) of an object is denoted by the position (pos). The position is represented with latitude (lat) and longitude (lon). As described above, the portion 14 describes the same position as that in the index. A tag (image ref) describes a link position and a file name of a picture file to be linked to the POI. The file name is based on the directory structure of the above-described memory card. A tag (comment) describes a character string of a comment of a picture linked to the POI. In the example shown in FIG. 3, the tag (comment) represents the model name of the digital still camera that photographed the picture.

A portion of the next line (portion 15) describes the category of the POI. A portion of the next line (gpstime) (portion 16) describes the date and time on/at which time information is received from GPS satellites. As shown in FIG. 4, the category is a four-byte code of a character string in hexadecimal notation. The first byte of the category code describes a large category. A category code (14000000) shown in FIG. 3 describes position information of a photographed (recorded) position. Using the category code, the shapes of icons can be varied for the individual categories.

In the method of which position information is directly recorded to a picture file and then stored to the memory card 108, for example a header of Exif is used. In other words, when the controlling microcomputer 105 adds a header to an Exif format picture file that has been compressed corresponding to the JPEG format, the controlling microcomputer 105 records the position information stored in the DRAM 104 to a GPS information area of the header.

Figure 5:
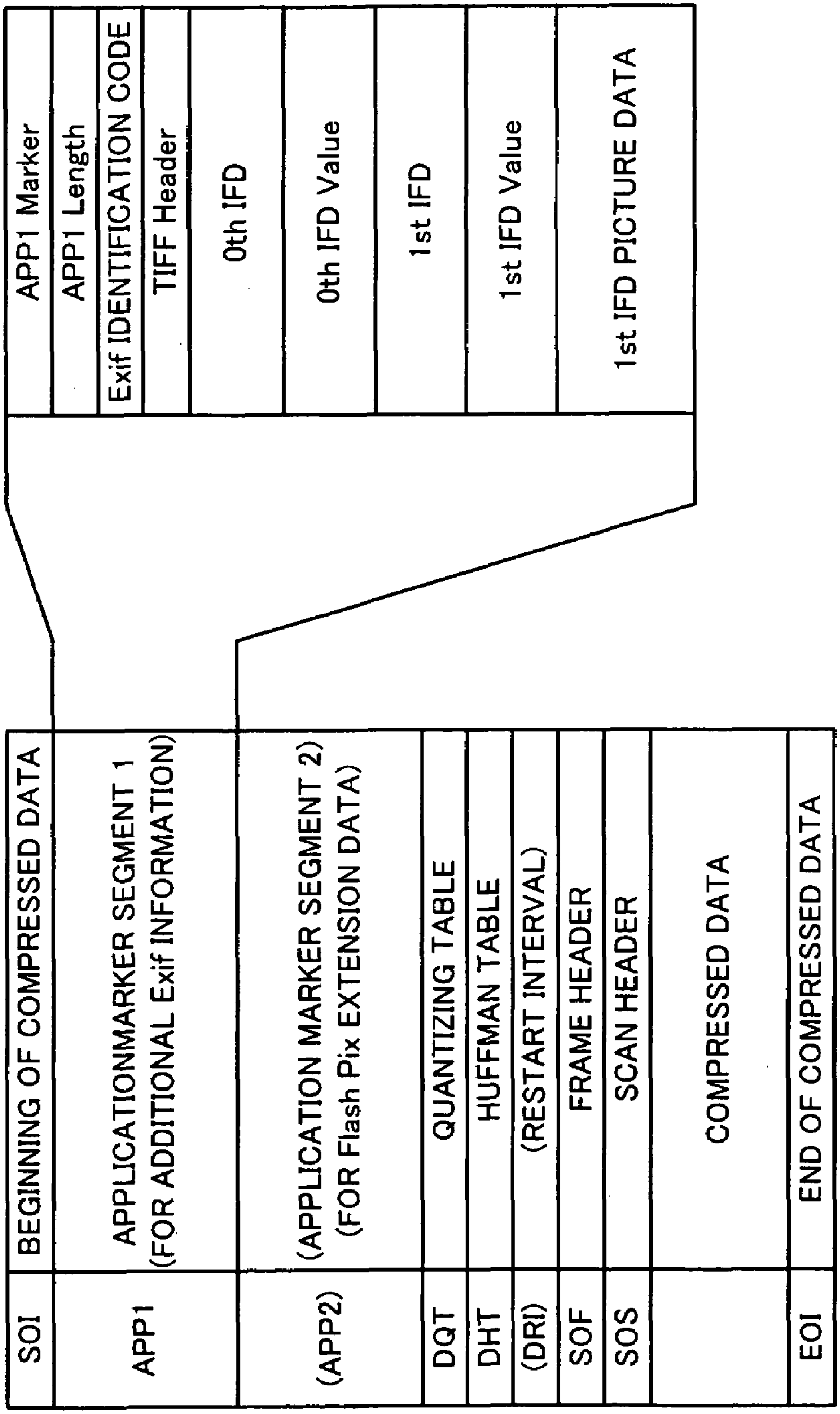
FIG. 5 is a schematic diagram showing an example of the data format of a compressed picture file according to the embodiment of the present invention.

FIG. 5 shows the structure of an Exif format compressed data file. Although the detail explanation is omitted, an application marker segment (APP1) is preceded by a compression data start SOI. The APP1 contains an APP1 marker, an Exif identification code, and additional information. The JPEG standard defines that the size of the APP1 does not exceed 64 kilobytes. The additional information contains GPS IFD. The GPS IFD is used to describe GPS information including the latitude and longitude of position information and date and time on/at which the position information was obtained.

Next, processes according to the embodiment of the present invention will be described. In other words, processes for reproducing map information, a picture file, and position information of a photographed position from the memory card 108, displaying the map picture on the picture displaying device 103, and displaying an icon at a position corresponding to the position information on the map are performed. Those processes are performed by the controlling microcomputer 105.

Figure 6:
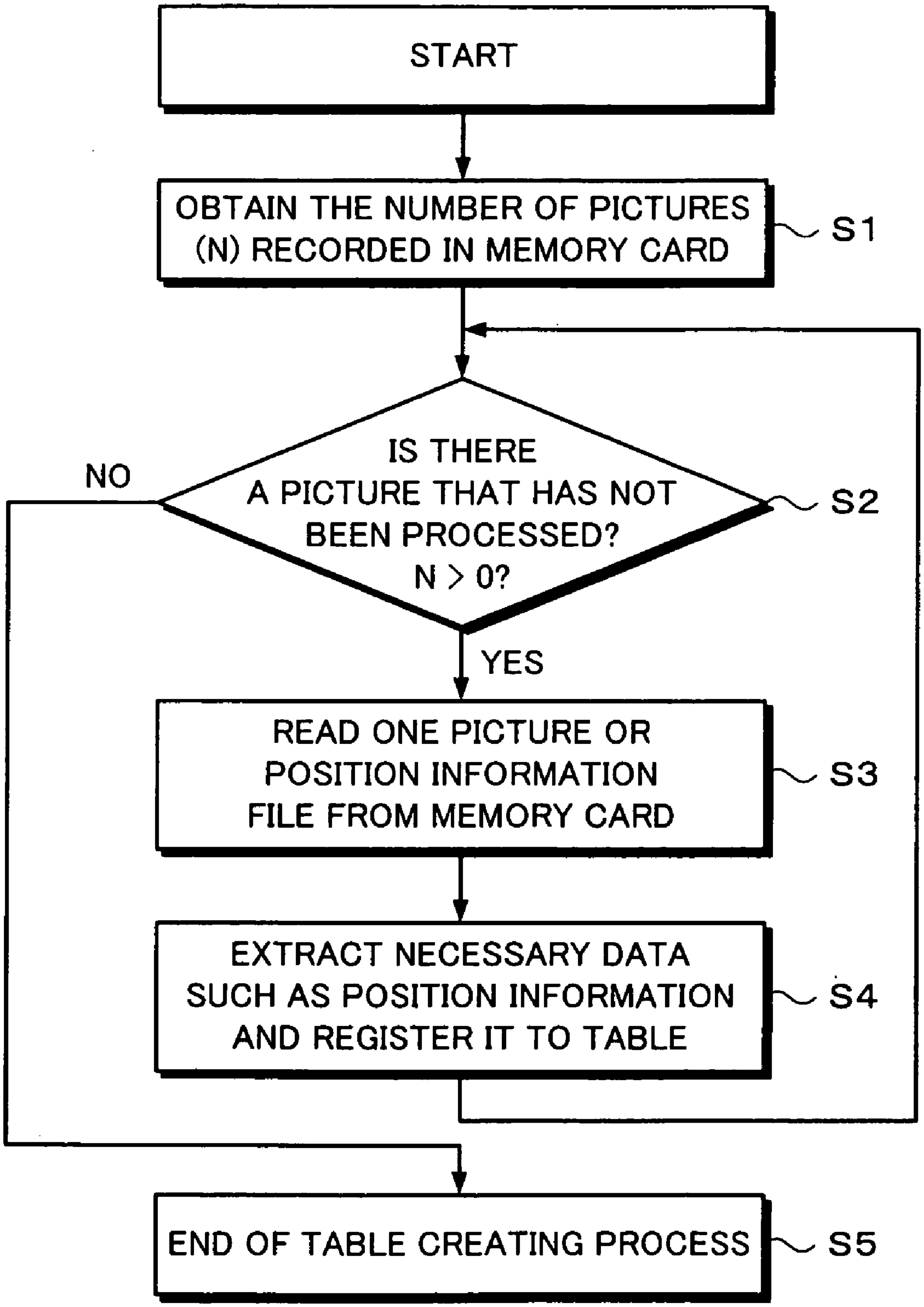
FIG. 6 is a flow chart for explaining a process for creating a table of position information according to the embodiment of the present invention.

First of all, a position information table that contains the position information of pictures stored in the memory card 108, the file numbers of the pictures, and additional information such as the categories of the pictures is created corresponding to a flow chart shown in FIG. 6. Before or after the position information table is created, map picture data is read from the memory card 108 through the memory card controller 107 and stored to the DRAM 104. The map picture data is read from the DRAM 104 and supplied to the picture displaying device 103 through the picture processing circuit 102. The map picture data is displayed on the picture displaying device 103. The map picture data contains range information. The range information represents the latitude and longitude of each corner of the square of the map.

As with the position information, a range information file may be created. Alternatively, range information may be directly recorded to a map picture file. In addition, as with the position information, the range information file may be contained in a POIX file. Alternatively, the range information may be written to the header of a picture file.

In the process shown in FIG. 6, the number of pictures (n) stored in the memory card 108 is obtained (at step S1). Thereafter, it is determined whether there is a picture (file) that has not been processed and the number of pictures (n) is larger than 0. When the determined result at step S2 is No (namely, there is no picture that has not been processed or the number of pictures (n) is 0), the table creating process is completed (at step S5).

When the determined result at step S2 is Yes (namely, there is a picture that has not been processed and the number of pictures (n) is larger than 0), the flow advances to step S3. At step S3, one picture or a position information file is read from the memory card 108. When position information is written to the header of a picture file in the data structure shown in FIG. 5, the position information can be read along with the picture file. When a position information file is recorded in the data format corresponding to the POIX (see FIG. 3), the position information file is read.

At step S4, necessary information such as position information is extracted from the picture file or the position information file and registered to the table. In the case of the position information file as shown in FIG. 3, with reference to only the index, position information and so forth can be quickly extracted. The data extracting operation is performed for all picture fiels recorded in the memory card 108.

FIG. 7 shows an example of a table stored in the RAM of the controlling microcomputer 105. In FIG. 7, position information and so forth of each of five positions are contained in the table. In FIG. 7, reference numerals 21 and 22 represent the latitude and longitude of position information (degree-minute-second notation or decimal notation), respectively. In Japan, reference numerals 21 and 22 represent values of north latitude and east longitude, respectively. Reference numeral 23 represents a category code. Reference numeral 24 represents a file name of a picture file containing position information. A category code (14000000) shown in FIG. 7 represents a category of photographed positions. A category code (04000000) represents a category of sightseeing spots and historical spots. A category code (05000000) represents a category of stores. (Dsc) of a file name of a position information file represents position information obtained whenever the shutter of the digital still camera is pressed. An extension (jpg) represents a file of which data has been compressed corresponding to the JPEG format.

Figure 8:
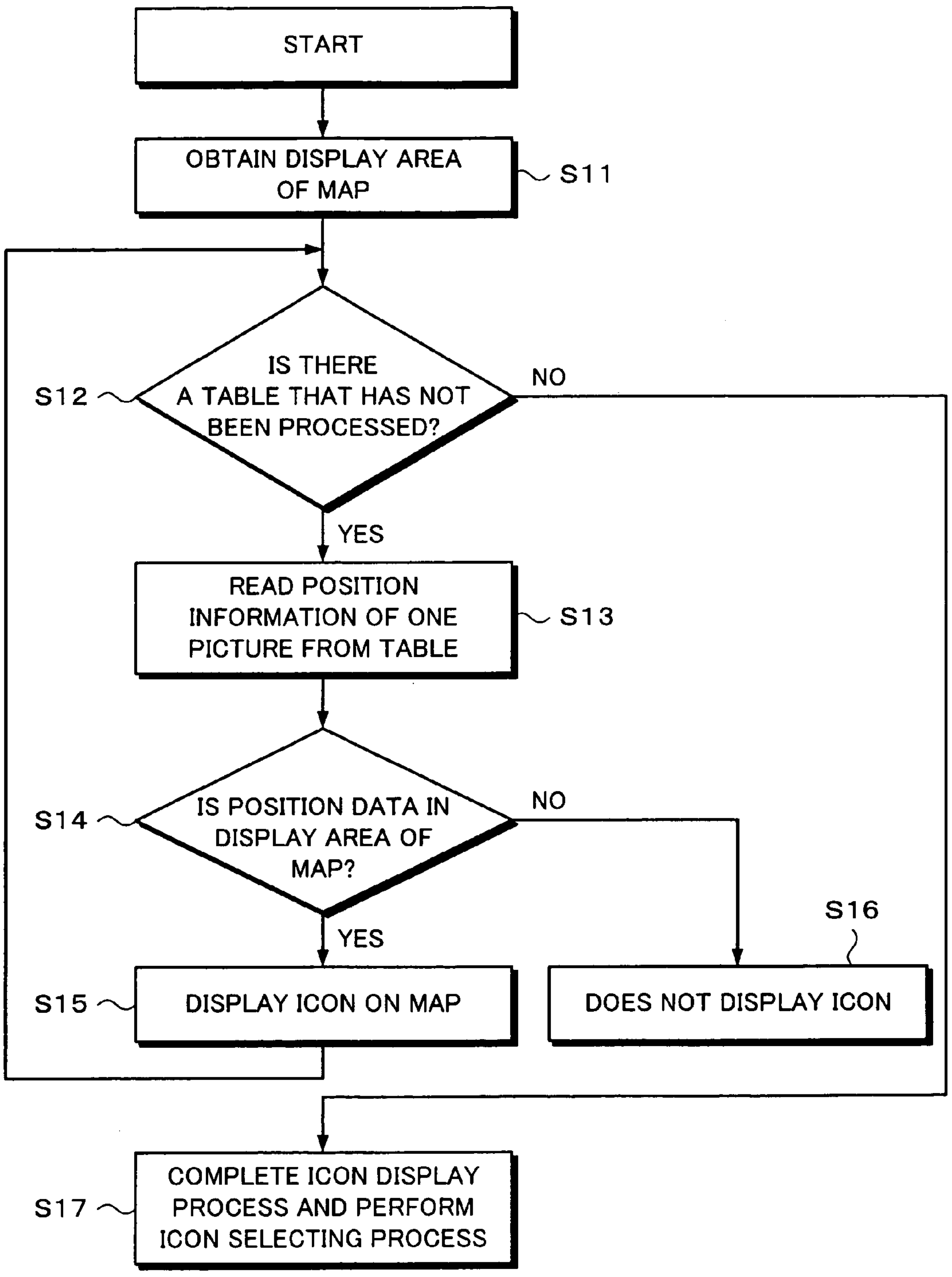
FIG. 8 is a flow chart for explaining an icon displaying process according to the embodiment of the present invention.

After the table has been created, icons are displayed corresponding to latitude and longitude information contained in the table corresponding to a process shown in a flow chart of FIG. 8. At that point, with the scale up switch 111 and the scale down switch 112, the size of the map can be enlarged and reduced, respectively. At step S11, the display area of the map is obtained corresponding to the range information, the enlargement ratio, and the reduction ratio of the map.

At step S12, it is determined whether or not there is a position information table that has not been processed. When the determined result at step S12 is No (namely, there is no position information table that has not been processed), the flow advances to step S17. At step S17, the icon displaying process is completed and then the icon selecting process is performed. When the determined result at step S12 is Yes (namely, there is a position information table that has not been processed), the flow advances to step S13. At step S13, position information (latitude and longitude) of one picture is read from the table. The data of one line shown in FIG. 7 is position data of one picture.

At step S14, it is determined whether or not the position data is in the display range of the map obtained at step S11. When the determined result at step S14 is No (namely, the positon data is not in the display area), an icon is displayed (at step S16). When the determined result at step S14 is Yes (namely, the positon data is in the display area), the flow advances to step S15. At step S15, an icon is displayed on the map. In reality, at step S14, the latitude or longitude of each corner of the square of the display range is compared with latitude or longitude of the position information. The loop from step S12 to step S16 is repeated for all position data of the position information table.

Figure 9:
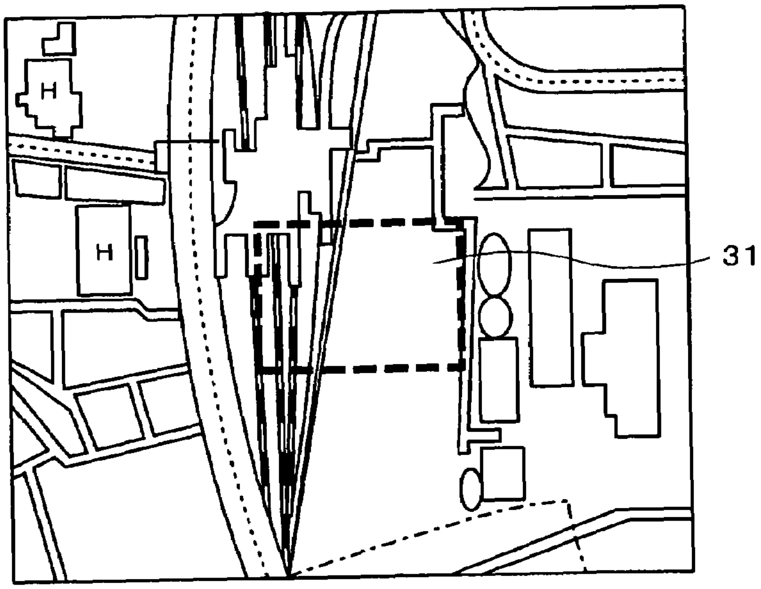
FIG. 9 is a schematic diagram showing an example of a map displayed according to the embodiment of the present invention.
Figure 10:
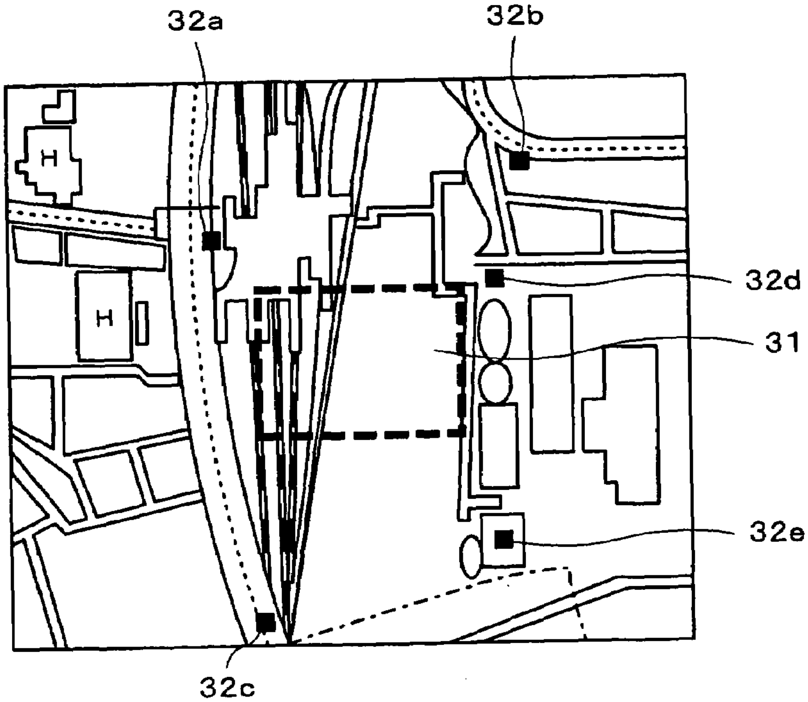
FIG. 10 is a schematic diagram showing an example of a displayed picture for explaining the icon displaying process according to the embodiment of the present invention.

FIG. 9 shows an example of a map picture displayed on the picture displaying device 103. A dotted square area 31 in the vicinity of the center of the map picture is an icon selection area. In the process shown in FIG. 8, for example, icons 32*a* to 32*e* corresponding to five positions of the table are displayed on the map as shown in FIG. 10. In FIG. 10, small black squares are icons corresponding to latitude and longitude data contained in the table. It should be noted that the icons may be displayed in another shape. Alternatively, the icons may be displayed in different shapes corresponding to categories of the category code. Once the position information is created, even if map information is changed, the process for creating the table shown in FIG. 9 can be omitted.

While the icons 32*a* to 32*e* are displayed on the map, a desired icon is placed at the closest position to the center of the selection area 31. Thus, the desired icon is selected. A picture linked to the selected icon is displayed on the picture displaying device 103. Next, with reference to FIG. 11, the icon selecting process and the picture displaying process will be described.

First of all, at step S21, the number of icons (m) in the selection area 31 is obtained. At step S22, it is determined whether or not the number of icons (m) is larger than 0 (namely, m>0). When the determined result at step S22 is Yes (namely, m>0), the flow advances to step S23. At step S23, an icon at the closest position to the center of the display screen is obtained. To place a desired icon (photographed position) in the selection area 31 or the center thereof, the scale up switch 111, the scale down switch 112, and the scroll—decide key set 113 are used.

Figure 13:
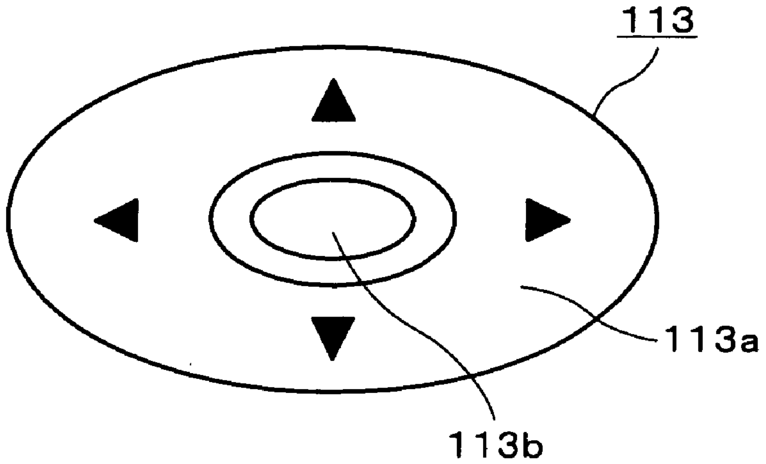
FIG. 13 is a schematic diagram showing an example of scroll and decide keys according to the embodiment of the present invention.

FIG. 13 shows an example of the scroll—decide key set 113 composed of a scroll key 113*a* and a decide key 113*b*. The scroll key 113*a* has arrows. With the scroll key 113*a*, the display screen can be scrolled in any direction. The decide key 113*b* is disposed at the center of the scroll key 113*a*. When the decide key 113*b* is pressed, the icon selecting process is completed and a picture corresponding to the selected icon is displayed.

Figure 12:
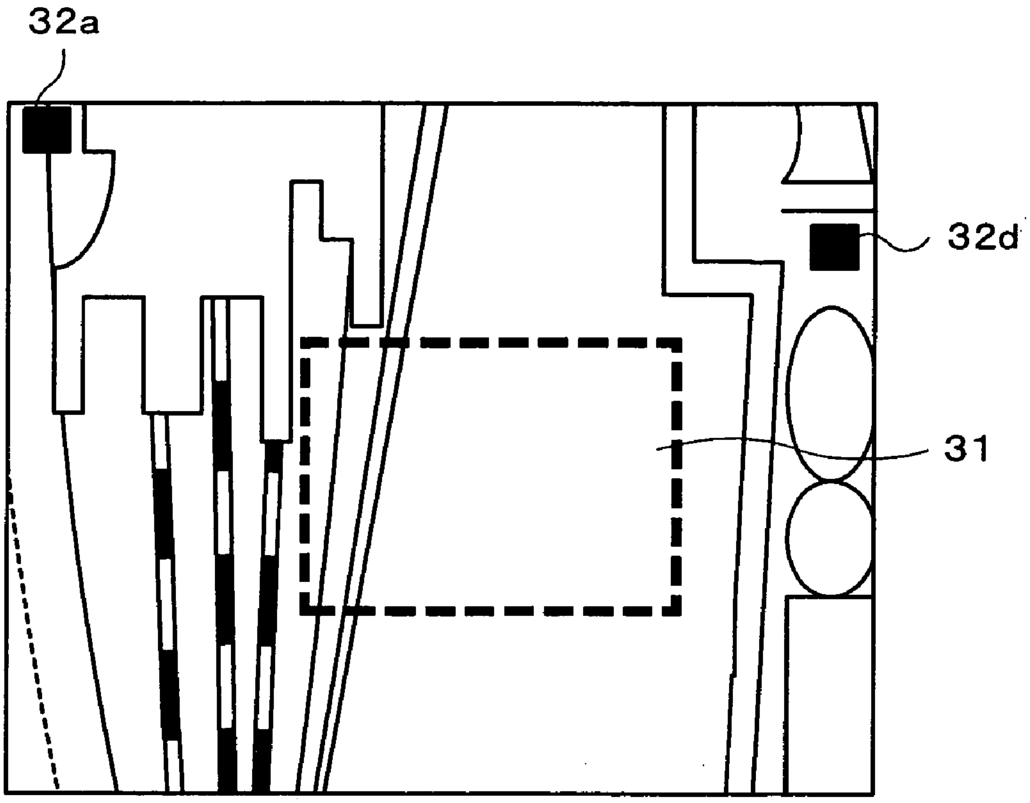
FIG. 12 is a schematic diagram showing an example of a displayed picture for explaining the icon selecting process according to the embodiment of the present invention.

The display area of the picture displaying device 103 of the portable photographing apparatus such as a digital still camera is narrow. To allow the user to more easily see a map that is displayed, he or she presses the scale up switch 111. FIG. 12 shows an enlarged picture. In this example, even if the map is enlarged, the positions of the icons 32*a* to 32*e* do not vary on the map. Thus, even if the display area is narrow, the user can accurately or fully know a desired position on the map. In the example shown in FIG. 12, no icon is displayed in the selection area 31. In that case, an icon cannot be selected. Thus, the flow advances to step S28. At step S28, the process is completed.

Figure 14:
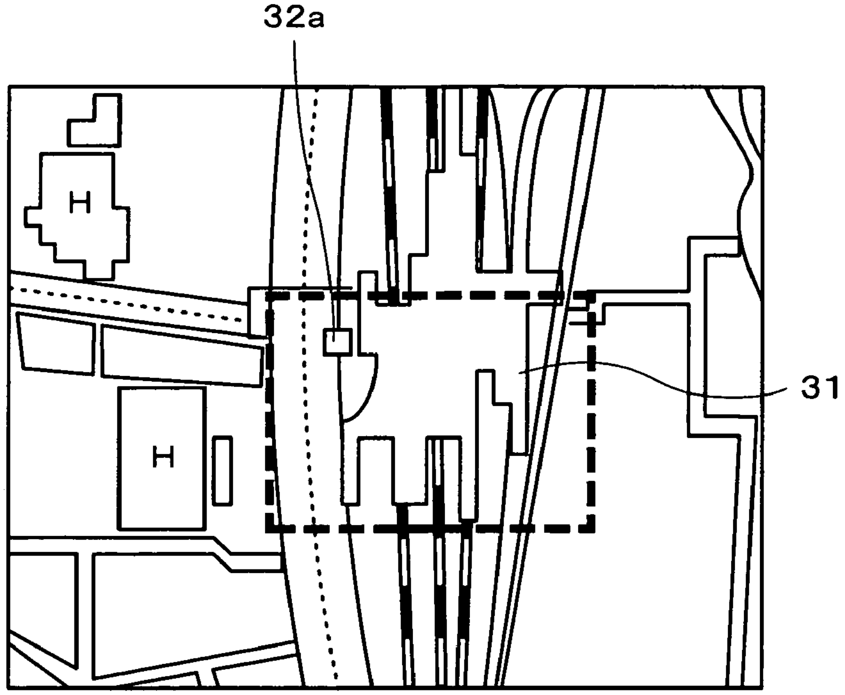
FIG. 14 is a schematic diagram showing an example of a displayed picture for explaining the icon selecting process according to the embodiment of the present invention.

Using the scale up switch 111, the scale down switch 112, and the scroll—decide key set 113, the user places a desired icon in the selection area 31. When the selection area 31 contains a plurality of icons, the desired icon is placed at the closest position to the center of the selection area 31. In an example shown in FIG. 14, with the switches and keys, the icon 32*a* is placed in the selection area 31. In the example, when the user presses the decide key 113*b*, the icon 32*a* is selected.

Figure 11:
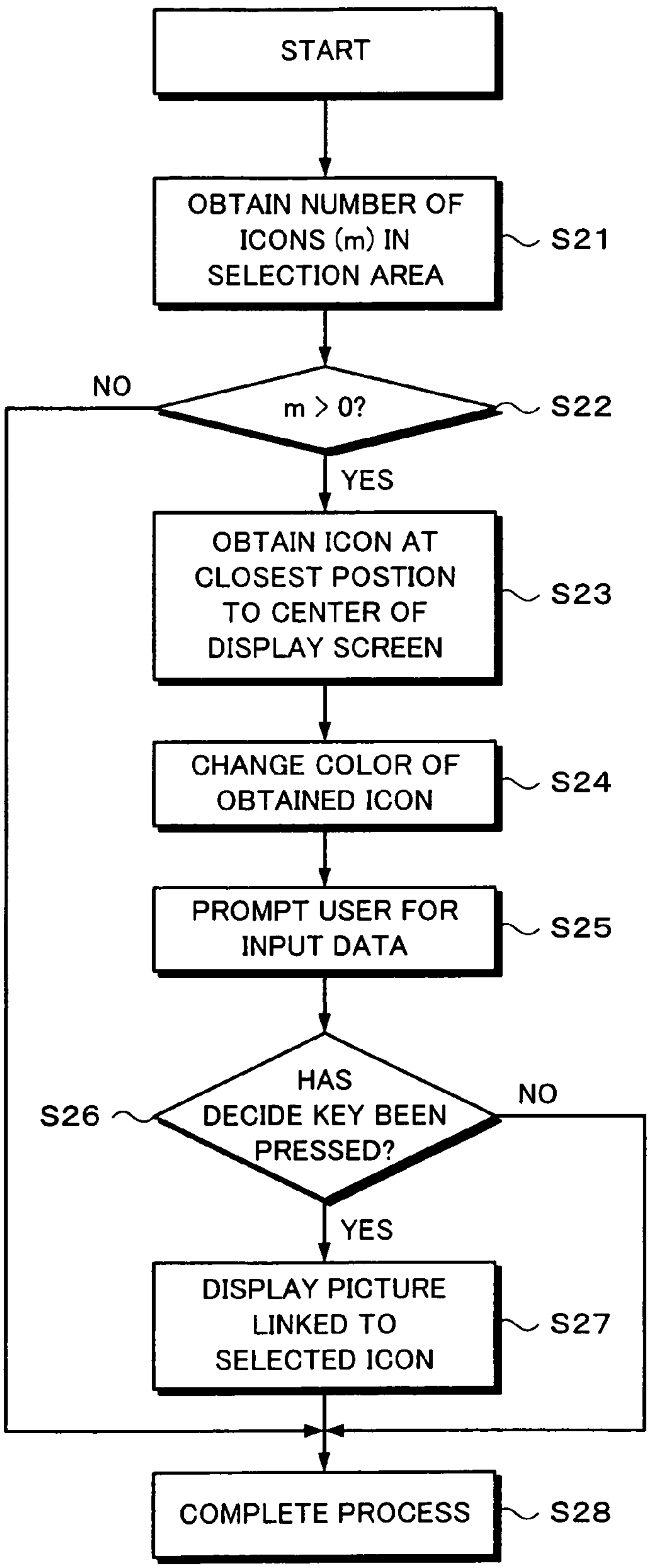
FIG. 11 is a flow chart for explaining a process for selecting an icon and displaying a picture linked to the selected icon according to the embodiment of the present invention.

At step S24 shown in FIG. 11, to notify the user that the icon 32*a* has been selected, the icon 32*a* is highlighted against other icons. For example, the color of the selected icon is varied. Alternatively, the selected icon is blinked. Alternatively, the selected icon may be displayed in a reverse color. Thereafter, the flow advances to step S25. At step S25, the apparatus prompts the user for input data.

Figure 15:
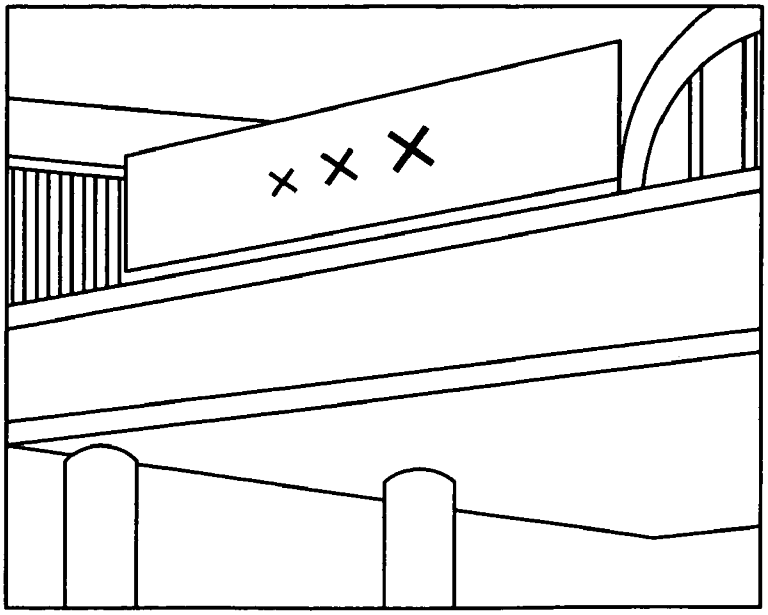
FIG. 15 is a schematic diagram showing an example of a picture linked to a selected icon according to the embodiment of the present invention.

At step S26, it is determined whether or not the decide key 113*b* has been pressed. When the determined result at step S26 is No (namely, the decide key 113*b* has not been pressed), the flow advances to step S28. At step S28, the process is completed. In reality, when the decide key 113*b* has not been pressed for a predetermined time period, it is determined that the decide key 113*b* has not been pressed. Alternatively, besides the decide key 113*b*, a cancel key may be disposed. When the determined result at step S26 is Yes (namely, the decide key 113*b* has been pressed), the flow advances to step S27. At step S27, a picture linked to the selected icon is displayed on the picture displaying device 103 instead of the map. FIG. 15 shows the state of which a picture linked to the selected icon 32*a* is displayed.

An icon at the current position may be displayed on the map. In that case, a map that contains range information is displayed so as to obtain position information from the GPS unit. When the obtained position information is in the display range, an icon that represents the current position is displayed on the map. Thus, the user can use the apparatus as a navigation system.

According to the above-described embodiment, as a means for obtaining position information, the GPS is used. Alternatively, another means such as a position information service of a cellular phone may be used. Alternatively, the user may designate the current position with a map displayed on the displaying device. In addition, without a means for obtaining position information, a table for displaying icons using position information that is read from a data record medium may be created. Moreover, position information and map information may be obtained from a map database through a communication network. Obtained map information may be hierarchically structured.

The above-described embodiment is a digital still camera. Likewise, the present invention can be applied to a digital photographing apparatus that photographs a moving picture. As long as position information is described in a predetermined data format, the present invention can be applied to other than the POIX data format. In addition, the present invention can be applied to other than the Exif format as a picture file format.

As described above, according to the present invention, a picture and position information are recorded to a record medium such as a memory card. A picture and position information are reproduced from the record medium. An icon corresponding to the position information is displayed on a map. Thus, position information of a picture such as a photographed position can be clearly displayed without a connection to another device. Thus, photographed pictures can be easily managed. In addition, according to the present invention, since position information is stored as a table, a process for displaying icons can be quickly and easily performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital photographing apparatus, portably structured, for recording a photographed digital picture signal to a recording medium and reproducing a digital picture signal from the recording medium, comprising:

photographing means for photographing a picture and outputting a picture signal;

signal processing means for processing the picture signal supplied from said photographing means to produce a digital picture signal;

position information obtaining means for obtaining position information, the position information including global position information;

displaying means for displaying the digital picture signal supplied from said signal processing means;

recording means for writing to the recording medium data comprising data relating to both the digital picture signal supplied from said signal processing means and the position information supplied from said position information obtaining means, said digital picture signal being recorded as a picture file and said position information being recorded as a position information file, said recording means associating data relating to the digital picture signal and data relating to the position information;

reproducing means for reproducing the digital picture signal and the position information from the recording medium;

map information obtaining means for obtaining map information comprising range information defining a set of boundary points of a map, thereby enabling a user of the digital photographing apparatus to choose a part of the map using the range information;

table creating means for creating a table that associates the position information file with said map information and said picture file; and controlling means for referencing the table to display on said displaying means an icon corresponding to the position information on a part of the map chosen by the user, the controlling means operable to determine the number of icons in the part of the map chosen by the user, determine the icon closest to the center of the part of the map chosen by the user, change at least one attribute of the icon closest to said center, and allow the user to decide whether the icon closest to said center of the part of the map chosen by the user is the desired icon; and wherein the table creating means creates the table using at least one position information file, the table indicating correspondence relation between the obtained position information and the picture file; and whereby when the user decides that the icon closest to said center is the desired icon a picture from the picture file, at a location corresponding to said icon, is displayed.

2. The digital photographing apparatus as set forth in claim 1, wherein the position information is position information of a position at which the picture is captured.

3. The digital photographing apparatus as set forth in claim 2, further comprising:

position measuring means for obtaining the position information of the position at which the picture is captured.

4. The digital photographing apparatus as set forth in claim 1, wherein the map information is obtained from the same recording medium as that of which the digital picture signal and position information are reproduced from.

5. The digital photographing apparatus as set forth in claim 1, wherein the map information contains range information that represents a range of the map to be displayed along with map data.

6. The digital photographing apparatus as set forth in claim 5, wherein an icon corresponding to the position information within the range of the map is displayed by referencing the range information.

7. The digital photographing apparatus as set forth in claim 1, wherein a selection range for selecting an icon is set at a part of the map displayed, and the selection of the icon is automatically performed if the icon is positioned in the selection range.

8. The digital photographing apparatus as set forth in claim 7, wherein the apparatus is configured to enlarge or reduce the displayed map in response to a user's operation, and change the position of the icon in response to the enlargement or reduction of the displayed map.

9. The digital photographing apparatus as set forth in claim 7, wherein the apparatus is configured to scroll the displayed map in response to a user's operation, and change the position of the icon in response to the scroll of the displayed map.

10. A digital photographing apparatus, portably structured, for recording a photographed digital picture signal to a recording medium and reproducing a digital picture signal from the recording medium, comprising:

photographing means for photographing a picture and outputting a picture signal;

signal processing means for processing the picture signal supplied from said photographing means to produce a digital picture signal;

position information obtaining means for obtaining position information, the position information including global position information;

displaying means for displaying the digital picture signal supplied from said signal processing means;

recording means for writing to the recording medium data comprising data relating to both the digital picture signal supplied from said signal processing means and the position information supplied from said position information supplied from said position information obtaining means, said digital picture signal being recorded as a picture file and said position information being recorded as a position information file, said recording means further comprising linking means for linking data relating to the digital picture signal and data relating to the position information;

reproducing means for reproducing the digital picture signal and the position information from the recording medium;

map information obtaining means for obtaining map information comprising range information defining a set of boundary points of a map, thereby enabling a user of the digital photographing apparatus to choose a part of the map using the range information;

table creating means for creating a table that associates the position information file with said map information and said picture file; and controlling means for referencing the table to display on said displaying means an icon corresponding to the position information on a part of the map chosen by the user the controlling means being operable to determine the number of icons in the part of the map chosen by the user, determine the icon closest to the center of the part of the map chosen by the user, and change at least one attribute of the icon closest to said center;

wherein the controlling means is operative to display on the display means, together with the map, an icon corresponding to respective items of the position information;

map scroll means for scrolling the displayed map in response to a user's operation; and icon selection means for selecting from icons displayed with the map, the selection of an icon being performed if the icon is positioned on the part of the map chosen by the user which is set with respect to a screen area of the displaying means;

whereby upon selection of an icon, a picture from the picture file, at a location corresponding to said icon, is displayed.

11. A camera for recording a digital picture signal to a recording medium and reproducing a digital picture signal from the recording medium, comprising:

an imaging device for capturing a picture and outputting a picture signal;

signal processor for processing the picture signal supplied from the imaging device to produce a digital picture signal;

a position information detector for obtaining position information, the position information including global position information;

a display for displaying the digital picture signal supplied from the signal processor;

a recording section for writing to the recording medium data comprising data relating to both the digital picture signal supplied from the signal processor and the position information supplied from the position information detector, said digital picture signal being recorded as a picture file and said position information being recorded as a position information file, said recording section further comprising linking means for linking data relating to the digital picture signal and data relating to the position information;

a reproducing section for reproducing the digital picture signal and the position information from the recording medium;

a map information obtaining section for obtaining map information comprising range information defining a set of boundary points of a map, thereby enabling a user of the camera to choose a part of the map using the range information;

a table creating section for creating a table that associates the position information file with said map information and said picture file; and a controller for referencing the table to display on said display an icon corresponding to the position information on a part of the map chosen by the user, the controller being operable to determine the number of icons in the part of the map chosen by the user, determine the icon closest to the center of the part of the map chosen by the user, change at least one attribute of the icon closest to said center, and allow the user to decide whether the icon closest to the center of the part of the map chosen by the user is the desired icon; and wherein the table creating section creates the table using at least one position information file, the table indicating correspondence relation between the obtained position information and the picture file;

whereby the table for the reproduced position information facilitates efficient performance of the camera;

and whereby when the user decides that the icon closest to said center is the desired icon, a picture from the picture file, at a location corresponding to said icon, is displayed.

* * * * *